Dec. 16, 1930.  E. A. EVERETT  1,785,516
RAILWAY SIGNAL LAMP
Filed Feb. 18, 1929  2 Sheets-Sheet 1

INVENTOR.
Edward A. Everett
BY
M. H. Loughridge
ATTORNEY.

Dec. 16, 1930.   E. A. EVERETT   1,785,516
RAILWAY SIGNAL LAMP
Filed Feb. 18, 1929   2 Sheets-Sheet 2

INVENTOR
Edward A. Everett
BY
M. H. Loughridge
ATTORNEY.

Patented Dec. 16, 1930

1,785,516

UNITED STATES PATENT OFFICE

EDWARD A. EVERETT, OF NEW YORK, N. Y.

RAILWAY SIGNAL LAMP

Application filed February 18, 1929. Serial No. 340,842.

This invention relates to railway light signals which are constructed in the form of a light projector, and the invention relates more particularly to the method of mounting and adjusting such projectors and has for its objects to provide a projector mounting which is universally adjustable, which can be applied to existing lamp brackets and which is low in cost. Other objects of the invention will appear from the following specification and the accompanying drawings forming part thereof, in which one form of my invention is described and illustrated as applied to railway light signals.

Figure 1:
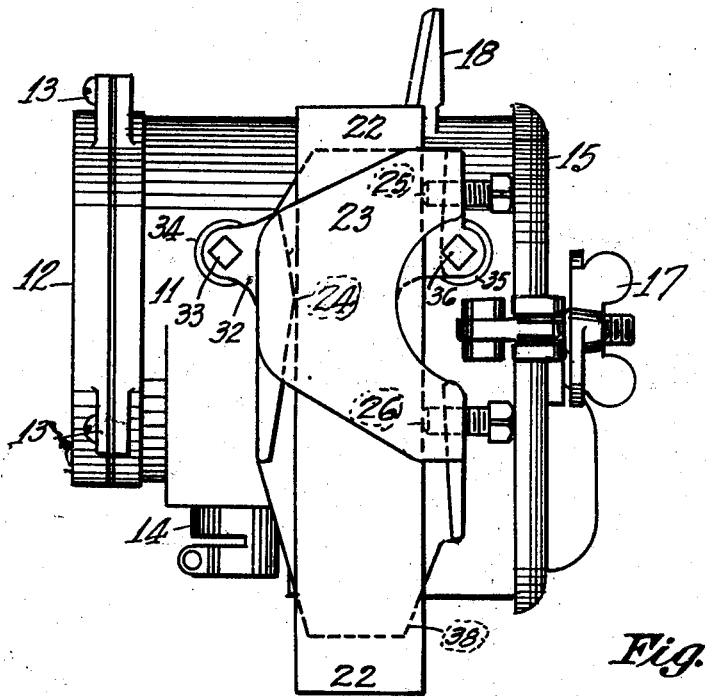
Fig. 1 is a side elevation of a projector mounted according to my invention.
Figure 2:
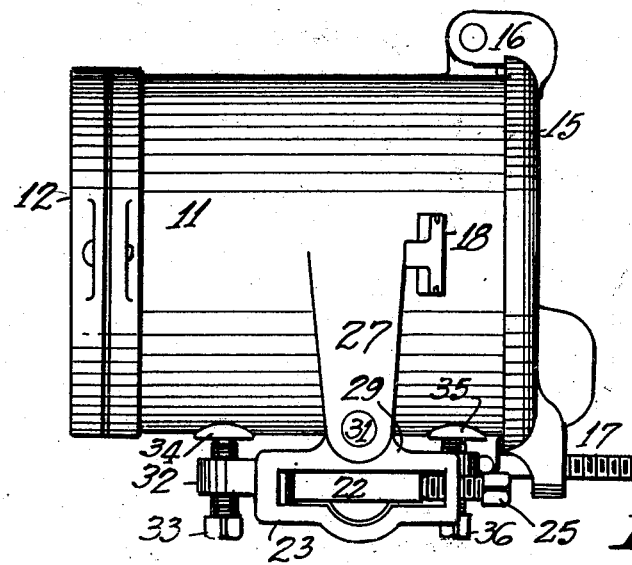
Fig. 2 is a top plan view corresponding to Fig. 1.
Figure 3:
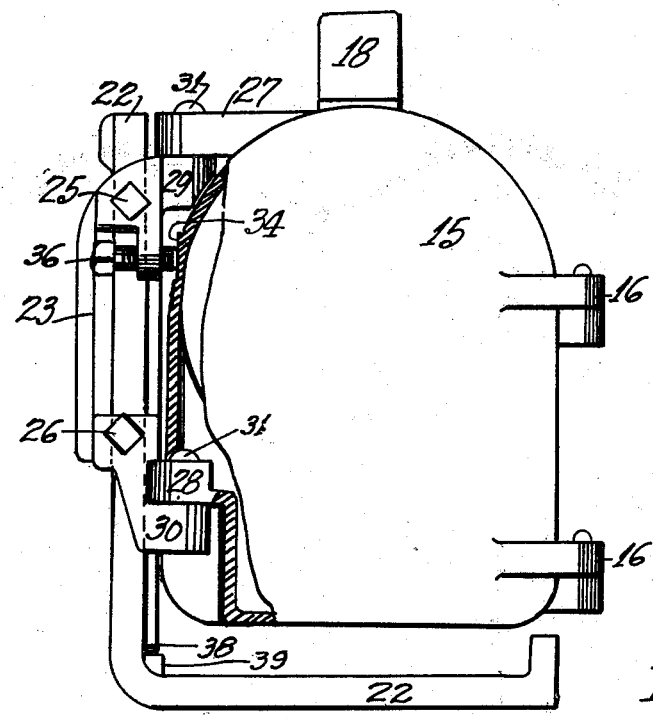
Fig. 3 is a rear view in elevation, with part of the casing in section to show the mounting.
Figure 4:
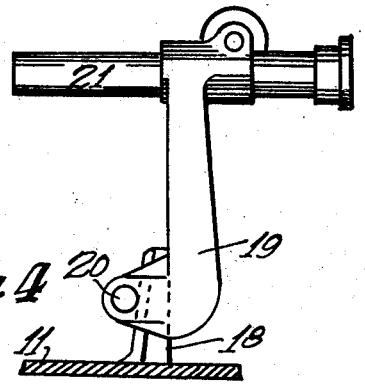
Fig. 4 is a sighting device used to align the projector.

Light projectors of the type used in railway signals are now used with a high degree of precision whereby their efficiency is increased and illumination by low voltage bulbs is practical. This efficiency has led to a demand for a mounting for the projector which can be adjusted with precision to direct the light beam as desired. The present invention provides a mounting of this type.

The projector housing may be constructed as illustrated in my co-pending applications, 60,899, filed Oct. 6, 1925, 303,349, filed August 31, 1928, or 306,636, filed Sept. 18, 1928. For the purpose of the present invention the housing is provided with a pair of pivots located on a vertical line. A slide clamped to a bracket by a three point clamp is provided with means to engage the vertical pivots of the housing and screws are provided to adjust the position of the housing on these pivots. This secures a universal adjustment for the projector housing.

In the drawings, 11 is the body of the projector housing, 12 is the roundal in front which secures the lens, (not shown) in place and 13 are screws for securing the roundal in place. The conduit for the electric wires is attached at 14 and the rear door is shown at 15. This door is hinged at 16 and fastened at 17 by a screw fastener.

The housing is aligned by a detachable sight comprising the sighting tube 21 supported by the arm 19 which is detachably secured to the projection 18 on top of the housing. This projection is wedge shaped and accurately faced so that when the arm 19 is forced into place by pin 20, the sighting tube aligns with the axis of the projector.

The right angle bracket 22 is usually secured to the signal mast and is of a standard type usually formed from a flat piece of iron. The bracket 23 is arranged to slide on the vertical arm of 22. This bracket encloses the arm 22 and is clamped to this arm in the position desired by the set screws 25 and 26 opposed by the point 24 engaging the opposite edge of 22.

Formed integral with the housing 11 are the lugs 27 and 28 projecting on one side of the housing and forming the supports for the vertical pivots 31—31. The rear of the bracket 23 has formed integral therewith the lugs 29 and 30 projecting from the rear of the bracket and engaging the pivots 31—31. This enables the housing 11 to swing on these pivots in a horizontal plane and its position relative to the bracket 23 is adjusted by the stud bolts 33 and 36, engaging the pads 34 and 35 respectively.

The inner, lower end of bracket 23 projects at 38 to engage the stop 39 in the arm 22 thereby limiting the downward movement of bracket 23 when it is released.

It will be noted that bracket 23 is tilted about point 24 by studs 25 and 26 and the projector is correspondingly tilted in azimuth and at the same time it may be rotated horizontally on pivots 31—31, thus providing a universal adjustment for the direction of the projected beam.

Having thus described my invention, I claim:

1. In a light projector support, the combination, a projector housing, a rectangular fixed arm, a sliding bracket adjustably clamped to said arm, pivotal means connecting said housing to said sliding bracket and screws in said bracket, one on either side of said pivot, engaging said housing for adjusting the horizontal position of said housing on said pivot.

2. In a light projector support, the combination, a projector housing having a pair of lugs vertically spaced, a vertical arm, a sliding bracket clamped to said arm by a three point clamp and having a pair of lugs vertically spaced and pivotal means connecting the lugs in said housing to the lugs in said bracket whereby said housing may be tilted vertically and rotated horizontally.

3. In a light projector support, the combination, a projector housing, a rectangular vertical arm, a sliding bracket clamped to said arm by a three point clamp, a pair of projections integrally formed on said bracket in vertical alignment and a pair of projections integrally formed on said housing pivotally connected with the projections of the bracket.

In testimony whereof I affix my signature.

EDWARD A. EVERETT.